(12) United States Patent  (10) Patent No.: US 11,589,314 B2
Yunusov et al.  (45) Date of Patent: Feb. 21, 2023

(54) WIDEBAND MICRO SLEEP TECHNIQUES

(71) Applicant: QUALCOMM Incorporated, San Diego, CA (US)

(72) Inventors: David Yunusov, Holon (IL); Peer Berger, Hod Hasharon (IL); Lior Uziel, Hod Hasharon (IL); Shay Landis, Hod Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/366,982

(22) Filed: Jul. 2, 2021

(65) Prior Publication Data

US 2023/0007582 A1 Jan. 5, 2023

(51) Int. Cl.
*H04W 72/04* (2009.01)
*H04W 52/02* (2009.01)
*H04W 4/40* (2018.01)
*H04W 52/52* (2009.01)

(52) U.S. Cl.
CPC .......... *H04W 52/028* (2013.01); *H04W 4/40* (2018.02); *H04W 52/52* (2013.01)

(58) Field of Classification Search
CPC ............. H04W 72/044; H04W 56/005; H04W 72/0406; H04W 4/40; H04W 72/10; H04W 76/14; H04W 72/0453; H04W 72/042; H04W 72/0446; H04W 92/18; H04L 27/2666; H04L 5/0053; H04L 27/2675; H04L 27/2613; H04L 5/0051; H04L 27/2684; H04L 27/2662; H04L 5/0055; H04L 1/1819; H04L 5/0064; H04L 1/1854; H04L 5/1469; H04L 1/1861; H04L 5/001; H04L 2001/0092; H04L 5/22; H04L 1/1812; H04L 5/0007; H04L 5/16
See application file for complete search history.

(56) References Cited

U.S. PATENT DOCUMENTS 10,091,818 B2   10/2018  Li et al.
10,820,300 B2*  10/2020  Noh .................... H04L 5/0053
10,820,348 B2*  10/2020  Khoryaev ............. H04W 4/46
(Continued)

FOREIGN PATENT DOCUMENTS

WO   WO-2020068253 A2   4/2020

OTHER PUBLICATIONS

International Search Report and Written Opinion—PCT/US2022/072619—ISA/EPO—dated Sep. 2, 2022.

*Primary Examiner* — Jung Liu
(74) *Attorney, Agent, or Firm* — Holland & Hart LLP

(57) ABSTRACT

Methods, systems, and devices for wireless communications are described. In a wireless communications system, a first user equipment (UE) may receive a message from a second UE via a set of one or more antennas, where a first symbol period and a second symbol period of the message include a duplicated signal, and the first symbol period is immediately prior to the second symbol period in a time domain. The first UE may calculate a correlation between first data included in the first symbol period and second data included in the second symbol period of the message for each antenna of the set of one or more antennas. In some cases, the first UE may power down at least one radio frequency chain based on the result of the calculated correlation satisfying a threshold value.

30 Claims, 10 Drawing Sheets

(56) References Cited

U.S. PATENT DOCUMENTS

| | | | |
|---|---|---|---|
| 2019/0044667 A1* | 2/2019 | Guo | H04L 1/1816 |
| 2020/0205165 A1* | 6/2020 | Huang | H04L 5/0051 |
| 2021/0022183 A1* | 1/2021 | Khoryaev | H04L 47/12 |
| 2021/0059005 A1 | 2/2021 | Hosseini et al. | |
| 2021/0076433 A1* | 3/2021 | Hou | H04W 56/002 |
| 2021/0127360 A1* | 4/2021 | Noh | H04W 72/14 |
| 2021/0136699 A1* | 5/2021 | Scholand | H04W 52/242 |
| 2021/0243728 A1* | 8/2021 | Lee | H04L 5/0044 |
| 2021/0289486 A1* | 9/2021 | Chiu | H04W 72/044 |
| 2021/0392618 A1* | 12/2021 | Hedayat | H04W 72/1278 |

* cited by examiner

WIDEBAND MICRO SLEEP TECHNIQUES

FIELD OF TECHNOLOGY

The following relates to wireless communications, including wideband micro sleep techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may use various techniques for saving power at a UE. In some cases, however, some power-saving techniques may prevent the UE from saving power relatively quickly when communicating with another device, and such techniques may instead delay power-savings until some amount of time after a message is received.

SUMMARY

The described techniques relate to improved methods, systems, devices, and apparatuses that support wideband micro sleep techniques. Generally, the described techniques provide for a user equipment (UE) to use wideband micro-sleep in, for example, a New Radio (NR) cellular vehicle-to-everything (CV2X) system. In some examples, a UE may reduce power consumption by shutting down a radio frequency (RF) chain and skipping modem processing from the beginning of a message after determining that a beginning of the message lacks relevant data (e.g., a valid signal intended for the UE). For instance, the UE may receive the first two symbols of a message, where the first two symbols include a duplicated wideband signal. The UE may calculate a correlation between the signals received in the first two symbols, and the UE may determine whether the message includes a valid signal based on comparing the correlation to a threshold. If the correlation is below the threshold, for example, then it may be determined that the first two symbols lack the relevant data (e.g., control information, a physical sidelink control channel (PSCCH)), and the UE may therefore power down one or more RF chains and modem processing for a remainder of the message (e.g., for a remaining duration of a subframe) to save power. In some cases, the described techniques may be combined with a demodulation reference signal (DMRS)-based approach, where the UE may identify a frequency-domain DMRS pattern associated with the message that the UE may use to further determine whether the message includes valid data for the UE.

A method for wireless communication at a first UE is described. The method may include receiving, via a set of one or more antennas, a message from a second UE, where a first symbol period and a second symbol period of the message include a duplicated signal, the first symbol period being immediately prior to the second symbol period in a time domain, calculating, for each antenna of the set of one or more antennas, a correlation between first data included in the first symbol period and second data included in the second symbol period of the message, and powering down at least one RF chain based on calculating the correlation between the first symbol period and the second symbol period, where the at least one RF chain is powered down based on a result of the calculated correlation satisfying a threshold value.

An apparatus for wireless communication at a first UE is described. The apparatus may include a processor, memory coupled with the processor, and instructions stored in the memory. The instructions may be executable by the processor to cause the apparatus to receive, via a set of one or more antennas, a message from a second UE, where a first symbol period and a second symbol period of the message include a duplicated signal, the first symbol period being immediately prior to the second symbol period in a time domain, calculate, for each antenna of the set of one or more antennas, a correlation between first data included in the first symbol period and second data included in the second symbol period of the message, and power down at least one RF chain based on calculating the correlation between the first symbol period and the second symbol period, where the at least one RF chain is powered down based on a result of the calculated correlation satisfying a threshold value.

Another apparatus for wireless communication at a first UE is described. The apparatus may include means for receiving, via a set of one or more antennas, a message from a second UE, where a first symbol period and a second symbol period of the message include a duplicated signal, the first symbol period being immediately prior to the second symbol period in a time domain, means for calculating, for each antenna of the set of one or more antennas, a correlation between first data included in the first symbol period and second data included in the second symbol period of the message, and means for powering down at least one RF chain based on calculating the correlation between the first symbol period and the second symbol period, where the at least one RF chain is powered down based on a result of the calculated correlation satisfying a threshold value.

A non-transitory computer-readable medium storing code for wireless communication at a first UE is described. The code may include instructions executable by a processor to receive, via a set of one or more antennas, a message from a second UE, where a first symbol period and a second symbol period of the message include a duplicated signal, the first symbol period being immediately prior to the second symbol period in a time domain, calculate, for each antenna of the set of one or more antennas, a correlation between first data included in the first symbol period and second data included in the second symbol period of the message, and power down at least one RF chain based on calculating the correlation between the first symbol period and the second symbol period, where the at least one RF chain is powered down based on a result of the calculated correlation satisfying a threshold value.

In some examples of the method, apparatuses, and non-transitory computer-readable medium described herein, receiving the message from the second UE may include operations, features, means, or instructions for receiving the message on a channel that satisfies a threshold bandwidth, where the correlation between the first symbol period and the second symbol period may be calculated for the channel that satisfies the threshold bandwidth.

In some examples of the method, apparatuses, and non-transitory computer-readable medium described herein, calculating the correlation between the first data included in the first symbol period and the second data included in the second symbol period of the message may include operations, features, means, or instructions for calculating the correlation between the first data included in the first symbol period and the second data included in the second symbol period based on a received signal strength indicator (RSSI) for at least one antenna of the set of one or more antennas.

In some examples of the method, apparatuses, and non-transitory computer-readable medium described herein, powering down the at least one RF chain based on calculating the correlation may include operations, features, means, or instructions for powering down the at least one RF chain for one or more additional symbol periods of the message, the one or more additional symbol periods being after the second symbol period in the time domain.

Some examples of the method, apparatuses, and non-transitory computer-readable medium described herein may further include operations, features, means, or instructions for powering down modem processing based on the result of the calculated correlation satisfying the threshold value, where the modem processing includes parameter estimation, channel and noise estimation, decoding, or any combination thereof.

Some examples of the method, apparatuses, and non-transitory computer-readable medium described herein may further include operations, features, means, or instructions for determining that the first symbol period and the second symbol period exclude control information based on the result of the calculated correlation satisfying the threshold value, where the at least one RF chain may be powered down based on the determination.

Some examples of the method, apparatuses, and non-transitory computer-readable medium described herein may further include operations, features, means, or instructions for performing automatic gain control (AGC) based on receiving the message, where a same gain state may be associated with the message and a second message received prior to the message and applying the same gain state to the first symbol period and the second symbol period of the message.

Some examples of the method, apparatuses, and non-transitory computer-readable medium described herein may further include operations, features, means, or instructions for determining that a gain state may have changed based on receiving the message and a second message received prior to the message and performing AGC on the received message in response to the determination that the gain state may have changed, where the AGC may be based on an initial portion of the first symbol period, and where the correlation between the first data included in the first symbol period and the second data included in the second symbol period may be based on the first data included in a remaining portion of the first symbol period and a corresponding portion of the second symbol period, the remaining portion of the first symbol period being different from the initial portion.

In some examples of the method, apparatuses, and non-transitory computer-readable medium described herein, calculating the correlation between the first data included in the first symbol period and the second data included in the second symbol period of the message may include operations, features, means, or instructions for calculating the correlation excluding one or more DMRS symbol patterns.

Some examples of the method, apparatuses, and non-transitory computer-readable medium described herein may further include operations, features, means, or instructions for determining a demodulation reference signal pattern in a frequency domain across two or more symbols of the message, where the at least one RF chain may be powered down based on the determined DMRS pattern and the result of the calculated correlation satisfying the threshold value.

In some examples of the method, apparatuses, and non-transitory computer-readable medium described herein, the at least one RF chain may be powered down based on the result of the calculated correlation being less than the threshold value.

In some examples of the method, apparatuses, and non-transitory computer-readable medium described herein, the first symbol period and the second symbol period may be received at a beginning of the message.

DETAILED DESCRIPTION

Figure 1:
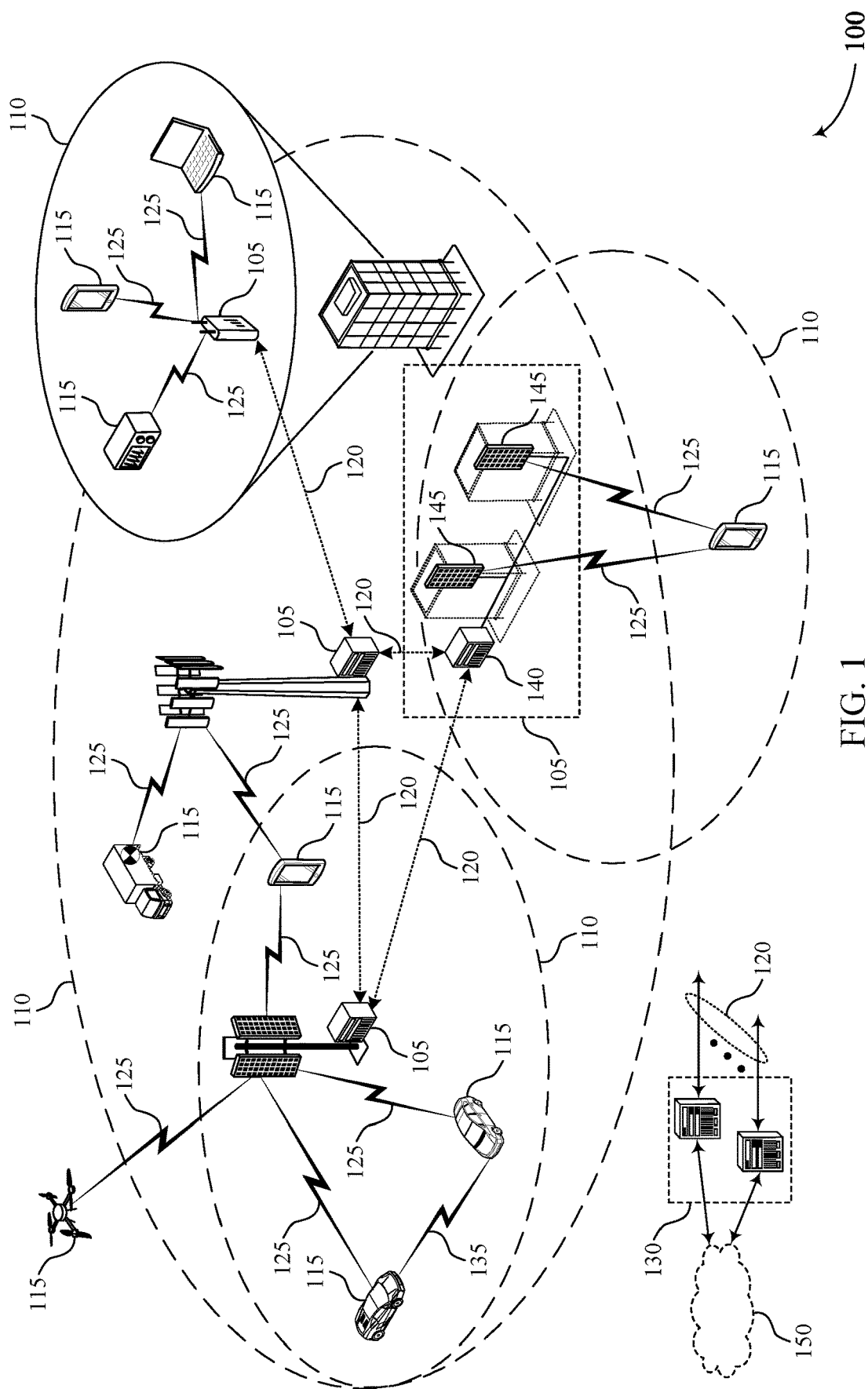
FIG. 1 illustrates an example of a wireless communications system that supports wideband micro sleep techniques in accordance with aspects of the present disclosure.

Some wireless communication systems may support communication between one or more wireless devices. For example, a wireless communications system may support sidelinks for communications between multiple user equipments (UEs). A sidelink may refer to any communication link between similar wireless devices (e.g., a communication link between UEs). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, cellular V2X (CV2X) communications, message relaying, discovery signaling, beacon signaling, or other signals transmitted over-the-air from one UE to one or more other UEs.

In some systems, power consumption may cause a chip in a UE to overheat. Further, a modem may shut down due to overheating if the modem is placed in a relatively high temperature environment (e.g., in a vehicle). Radio frequency (RF) processing (e.g., by various components of an RF chain) may also contribute to chip power consumption, and therefore, may further contribute to overheating. As such, techniques that provide enhanced power savings through the reduction of RF processing may assist a UE in avoiding shutting down a modem due to excess power consumption and the resultant heat.

In some cases, to reduce power consumption, a UE may use micro-sleep procedures for temporarily saving power when not communicating with another device and enabling relatively reduced power consumption when in a sleep state. In one example, the UE may use a per-subchannel micro-sleep approach based on a demodulation reference signal (DMRS) correlation, where the UE may shut off modem processing for a subframe after determining that a subframe lacks relevant data. However, some power-saving techniques may lack applicability to wideband signals. Additionally or alternatively, some power-saving techniques may cause the UE to process or estimate multiple symbol periods of a subframe, thereby preventing the UE from entering micro-sleep relatively sooner (e.g., after receiving the subframe).

Techniques described herein enable the UE to use wideband micro-sleep in a wireless communications system (e.g., a New Radio (NR) CV2X system). In some examples, the UE may reduce power consumption by shutting down an RF chain and skipping modem processing from the beginning of a message upon determining that a beginning of the message excludes relevant data (e.g., for a valid signal). In particular, the UE may receive a first symbol period and a second symbol period of the message (e.g., the first two symbol periods of the message), where the first symbol period and the second symbol period may include a duplicated wideband signal. The UE may calculate a correlation between respective signals received in the two symbol periods, and the UE may decide whether the message contains a valid signal based on comparing the correlation to a predetermined threshold. If the correlation is below the threshold, for example, then the UE may determine that the first two symbols lack relevant data (e.g., control information, a physical sidelink control channel (PSCCH)), and the UE may, as a result, power down one or more RF chains and/or modem processing for the remainder of the subframe to save power. Such techniques may enable the UE to enter into micro-sleep relatively quickly (e.g., relatively shortly after receiving the message, relatively shortly after the second symbol period of the message), enabling enhanced power savings at the UE. In some cases, the described techniques may be combined with a DMRS-based approach, where the UE may identify a DMRS pattern (e.g., a frequency-domain DMRS pattern) associated with the message that the UE may use to further determine whether the message includes valid data for the UE. In some cases, the use of the DMRS pattern may enable an additional degree of accuracy in determining whether the wideband message includes valid data for the UE.

Particular aspects of the subject matter described herein may be implemented to realize one or more advantages. The described techniques may support improvements in wideband micro-sleep. For example, the UE may power down RF chains and modem processing based on a correlation between received signals, which may reduce the amount of modem processing and subsequent power consumption and overheating at the UE, therefore improving the overall quality of communications between wireless devices. As such, supported techniques may include improved network operations, and, in some examples, may promote network efficiencies, among other benefits.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to wideband micro sleep techniques.

FIG. 1 illustrates an example of a wireless communications system 100 that supports wideband micro sleep techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support communication between one or more wireless devices. For example, a wireless communications system may support sidelinks for communications between multiple UEs 115. A sidelink may refer to any communication link 125 between similar wireless devices (e.g., a communication link 125 between UEs 115). It is noted that while various examples provided herein are discussed for UE sidelink devices, such sidelink techniques may be used for any type of wireless devices that use sidelink communications. For example, a sidelink may support one or more of D2D communications, V2X or V2V communications, CV2X communications, message relaying, discovery signaling, beacon signaling, or other signals transmitted over-the-air from one UE 115 to one or more other UEs 115.

In some cases, a UE 115 may use wideband micro-sleep in wireless communications system 100. In some examples, the UE 115 may reduce power consumption by shutting down an RF chain and skipping modem processing from the beginning of a subframe after determining that the beginning of the subframe lacks relevant data (e.g., for a valid signal). The UE 115 may receive the first two symbols of a message including a duplicated wideband signal. The UE 115 may calculate a correlation between the signals received in the two symbols, and the UE 115 may decide whether the message includes a valid signal based on comparing the correlation to a known threshold. In cases where the correlation is below the threshold, for example, then it may be determined that the first two symbols lack the relevant data (e.g., control information, a PSCCH), and the UE 115 may power down one or more RF chains and modem processing for the rest of the subframe to save power. In some cases, the described techniques may be combined with the DMRS-based approach, where the UE 115 may identify a frequency-domain DMRS pattern associated with the message that the UE 115 may use to further determine whether the message includes valid data for the UE 115.

Figure 2:
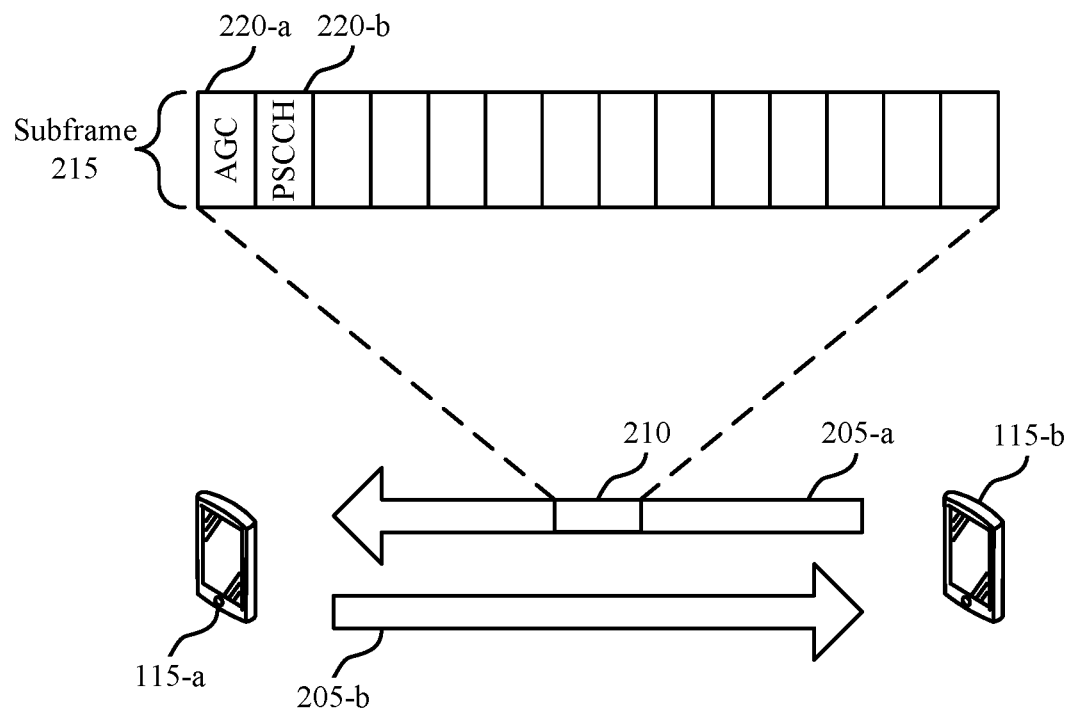
FIG. 2 illustrates an example of a wireless communications system that supports wideband micro sleep techniques in accordance with aspects of the present disclosure.

FIG. 2 illustrates an example of a wireless communications system 200 that supports wideband micro sleep techniques in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a and a UE 115-b, which may be examples of corresponding devices described herein with reference to FIG. 1. The wireless communications system 200 may include features for improved communications between the UEs 115, among other benefits.

In some cases, the UE 115-a and the UE 115-b may communicate via a sidelink communications link 205-a and a sidelink communications link 205-b. In some cases, the UEs 115 may support CV2X communications, where a modem at a UE 115 may be located in a relatively high-temperature environment (e.g., a UE 115 may be part of or may be a vehicle). In some cases, power consumption may be challenging in wireless communications due to heating of a chip in the modem. For example, because the modem may be placed in a relatively high-temperature environment (e.g., 85° C. ambient), any heating up to 105° C. may cause the modem to shut down. In some cases, RF chains, or analog functions in a UE 115, or both may be a contributor to chip power consumption.

To enable power savings, UE 115-a and/or UE 115-b may use various sleep or micro-sleep techniques to turn off one or more RF components of the UE 115 for some amount of time and achieve relatively reduced power consumption. For example, the UE 115-a may use micro-sleep techniques that may be based on a DMRS pattern correlation. For example, the UE 115-a may determine if each subframe of a message lacks relevant data (e.g., a signal) based on a DMRS pattern. If the subframes lack the relevant data, the UE 115-a may reduce power consumption by turning off the modem processing, RF functions, or both for the remainder of the subframe. Such techniques, however, may include the UE 115-a staying awake for multiple symbol periods, delaying a time when the UE 115-a may enter into a sleep state.

In some cases, the UE 115-a may use an improved micro-sleep approach that is based on data included in a first two symbols (e.g., and, in some cases, in addition to one or more DMRS symbols) of a message 210, which may enable the UE 115-a to use micro-sleep relatively more quickly, leading to enhanced power savings at the UE 115-a. For example, the UE 115-a may reduce power by shutting down an RF chain or an analog chain and skipping modem processing from the beginning of a subframe (e.g., in symbol 0, symbol 1) after determining that there is no relevant data in that subframe (e.g., in symbol 0, symbol 1). In some cases, such techniques may provide power savings over the exclusive use of DRMS-patterns per subchannel. However, as described herein, the described techniques may be enhanced using DMRS patterns and may enable the UE 115-a to determine whether to reduce modem processing on a wideband signal, thus enabling efficient micro-sleep and power savings.

The UE 115-b may transmit a message 210 to the UE 115-a over the sidelink communications link 205-a. The message 210 may include a subframe 215 (e.g., the message 210 may include data transmitted during the subframe 215), where the first two symbols in the subframe 215 may include a duplicated signal (e.g., for automatic gain control (AGC) convergence). For example, the UE 115-a may receive a first symbol 220-a (e.g., the symbol 0) and a second symbol 220-b (e.g., the symbol 1), where the first symbol 220-a and the second symbol 220-b may be the same (e.g., symbol 0 is duplicated to symbol 1).

After receiving the first symbol 220-a and the second symbol 220-b, the UE 115-a may perform a correlation between first data included in the first symbol 220-a and second data included in the second symbol 220-b of the message 210, and the UE 115-a may determine, based on a known threshold, whether the message 210 contains a valid signal. In some examples, for the received signal $y_{a,0}$, $y_{a,1}$ in the time domain (e.g., the wideband signal) at the k index of the time domain buffer, and a coarse received signal strength indicator (RSSI) $\hat{P}_{a,0}^2$, $\hat{P}_{a,1}^2$ for the antenna a at symbols 0 and 1 (e.g., the first symbol 220-a and the second symbol 220-b), the UE 115-a may calculate the correlation per antenna a between the two symbols. For example, the UE 115-a may calculate the correlation using Equation 1:

$$\hat{R} = \sum_{a=0}^{1} \frac{\left| \sum_{k} (y_{a,0}[k] \cdot conj(y_{a,1}[k])) \right|}{\sqrt{\hat{P}_{a,0}^2} \cdot \sqrt{\hat{P}_{a,1}^2}} \quad (1)$$

In some cases, if the correlation, $\hat{R}$, satisfies a threshold (e.g., is below some threshold value), then the UE 115-a may determine that the first symbol 220-a and the second symbol 220-b exclude (e.g., do not contain) a valid signal, such as a PSCCH message. That is, if $\hat{R}$<threshold, then the UE 115-a may determine that there is no PSCCH included in the received message. The threshold may be preconfigured or configurable by the UE 115-a such that it may provide a relatively lowest performance loss.

Additionally or alternatively, the UE 115-a may calculate a correlation for a received signal in the frequency domain. In particular, the UE 115-a may determine whether the message 210 includes data for the UE 115-a based on a correlation between respective portions of the message in the frequency domain. Based, at least in part, on a result of the calculated frequency-domain correlation, the UE 115-a may determine to enter into a micro-sleep mode to save power (e.g., the result of the frequency-domain correlation may indicate that the message 210 excludes valid data, data for the UE 115-a, or both).

The described techniques may be applied to wideband signals, which may avoid the UE 115-a determining whether the message 210 includes valid data, for example, on a sub-band level. In such cases, the message 210 may include a wideband signal such that the message 210 is transmitted on a channel that satisfies a threshold bandwidth greater than the bandwidth of a subchannel. If no control channel (e.g., a PSCCH) is found in the first symbol 220-a or the second symbol 220-b (e.g., which is at the second symbol in the subframe), then the UE 115-a may enter micro-sleep and may shut off (e.g., power down) the RF chains, analog chains, modem processing, or a combination thereof for the rest of the subframe 215 (e.g., which may have a total of 14 symbols 220 (e.g., OFDM symbols, symbol periods)). In some cases, the modem processing may include parameter estimation, channel and noise estimation, decoding, or other processing functions, which may be avoided when the UE 115-a is in a sleep state. As such, the UE 115-a may shut off the modem processing at the second symbol 220-b, effectively saving the power the UE 115-a may use for the remaining 14 symbols 220 in the subframe 215.

In some examples, the first symbol 220-a (e.g., symbol 0) may be used for AGC convergence, and the second symbol 220-b (e.g., symbol 1) may be used for a PSCCH, where the PSCCH data in the second symbol 220-b may be duplicated in the first symbol 220-a. In some cases, if the AGC gain state remains the same between different subframes 215 (e.g., if the received power has not changed), then the UE 115-a may use the described techniques as the first symbol 220-a and the second symbol 220-b carry a duplicated signal. However, if the AGC gain state does change between different subframes 215 (e.g., if the power changes), then the UE 115-a may use a remainder of the first symbol 220-a after the AGC convergence. More specifically, the UE 115-a may perform AGC on the first symbol 220-a until AGC convergence during a first portion (e.g., an initial portion) of the first symbol 220-a. Then, the UE 115-a may calculate the correlation between the data included in a remaining portion of the first symbol 220-a and data included in a corresponding portion of the second symbol 220-b to determine whether to enter into the sleep state.

In some cases, when performing the correlation calculation, the UE 115-a may assume that any impairments that may be added to the signal, such as a timing, frequency, or channel offset, may be the same across the first symbol 220-a and the second symbol 220-b (e.g., because they are consecutive symbols 220), and may cancel out during the correlation calculation due to the conjugate function performed on the second symbol 220-b (e.g., $y_{a,1}[k]$). In some cases, because the data for an NR CV2X PSCCH may be duplicated on the first symbol 220-a and the second symbol 220-b, the UE 115-a may calculate the correlation excluding one or more DMRS symbol patterns. For example, using the DMRS-based approach, the UE 115-a may estimate the correct timing, frequency, and channel impairments, which may lead to increased power consumption and signal degradation due to estimation errors. If the UE 115-a refrains from compensating for such impairments, the signal performance may be significantly degraded. As such, the UE 115-a may compensate for the impairments when calculating the correlation between the data included in the first symbol 220-a and the data included in the second symbol 220-b (e.g., using the conjugate function as shown in Equation 1). In some cases, since the UE 115-a performs the correlation calculation on the same data with a difference of one symbol 220 apart (e.g., since the first symbol 220-a and the second symbol 220-b are close together), the UE 115-a may lack the effects of Doppler spread (e.g., due to the velocity of the vehicles in a CV2X system) which may result in a high correlation metric. In some cases, the described techniques may be combined with a DMRS-based approach, where the UE 115-a may identify a frequency-domain DMRS pattern associated with the message that the UE 115-a may use to further determine whether the message includes valid data for the UE 115-a. As such, the UE 115-a may estimate the time, frequency, and channel impairments on at least one symbol 220 per subframe 215.

The techniques described herein may enable the UE 115-a to save power and reduce heating, thus allowing the chip to avoid temperatures which may cause the chip to shut down. Compared to the DMRS-based approach where the UE 115-a may calculate a correlation per subchannel, the described techniques allow the UE 115-a to calculate a correlation for an entire subframe 215 (e.g., a wideband calculation), which may create more processing gain. Additionally or alternatively, the UE 115-a may skip the entire modem processing for both a PSCCH and a physical sidelink shared channel (PSSCH) using the described techniques. That is, when the UE 115-a enters micro-sleep, the UE 115-a may perform a simple correlation between two received symbols 220 and refrain from expending power on the other modem processing functions.

Figure 3:
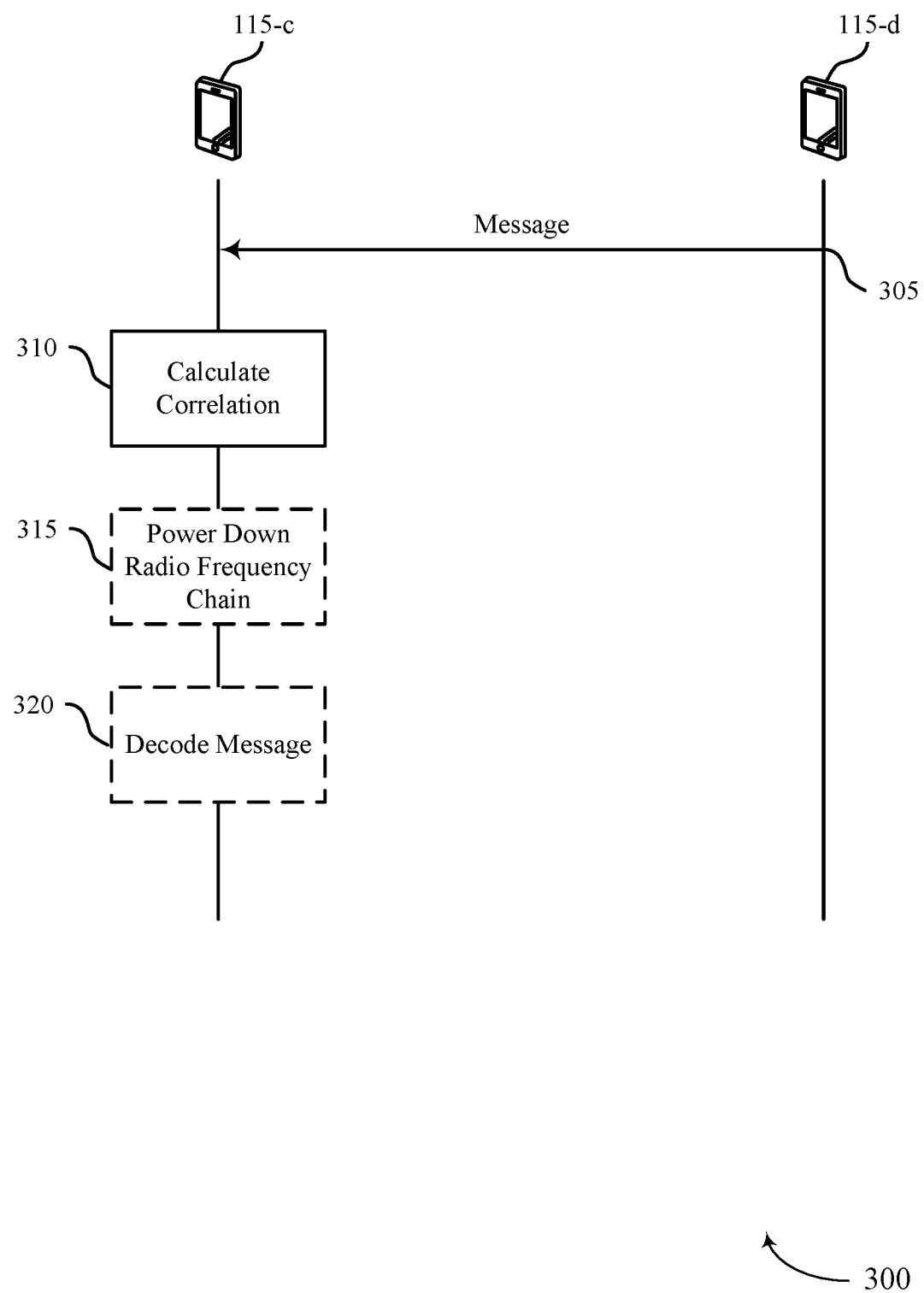
FIG. 3 illustrates an example of a process flow that supports wideband micro sleep techniques in accordance with aspects of the present disclosure.

FIG. 3 illustrates an example of a process flow 300 that supports wideband micro sleep techniques in accordance with aspects of the present disclosure. The process flow 300 may implement aspects of wireless communications systems 100 and 200, or may be implemented by aspects of the wireless communications system 100 and 200. For example, the process flow 300 may illustrate operations between a first UE 115-*c* and a second UE 115-*d*, which may be examples of corresponding devices described with reference to FIGS. 1 and 2. In the following description of the process flow 300, the operations between the first UE 115-*c* and the second UE 115-*d* may be transmitted in a different order than the example order shown, or the operations performed by the first UE 115-*c* and the second UE 115-*d* may be performed in different orders or at different times. Some operations may also be omitted from the process flow 300, and other operations may be added to the process flow 300.

At 305, the first UE 115-*c* may receive, via a set of one or more antennas, a message from the second UE 115-*d*, where a first symbol period and a second symbol period of the message include a duplicated signal, the first symbol period being immediately prior to the second symbol period in the time domain. For example, the first and second symbol periods may be the first two symbols at the beginning of a subframe of the message. In some cases, the first UE 115-*c* may receive the message on a channel that satisfies a threshold bandwidth (e.g., a wideband).

At 310, the first UE 115-*c* may calculate, for each antenna of the set of one or more antennas, a correlation between first data included in the first symbol period and second data included in the second symbol period of the message. In some cases, the correlation may be based on the received signal and an RSSI for at least one antenna of the set of one or more antennas.

At 315, the first UE 115-*c* may go into micro-sleep and power down at least one RF chain based at least in part on calculating the correlation between the first data included in the first symbol period and the second data included in the second symbol period, wherein the at least one RF chain is powered down based on a result of the calculated correlation satisfying a threshold value. In some cases, the UE may power down the at least one RF chain if the correlation is below a known threshold and therefore, if the first two symbols lack relevant data (e.g., control information, a PSCCH).

At 320, the first UE 115-*c* may refrain from going into micro-sleep and may decode the relevant information in the message. For example, the UE may refrain from powering down the at least on RF chain if the correlation is above a known threshold and if the first two symbols contain relevant data (e.g., control information, a PSCCH).

Figure 4:
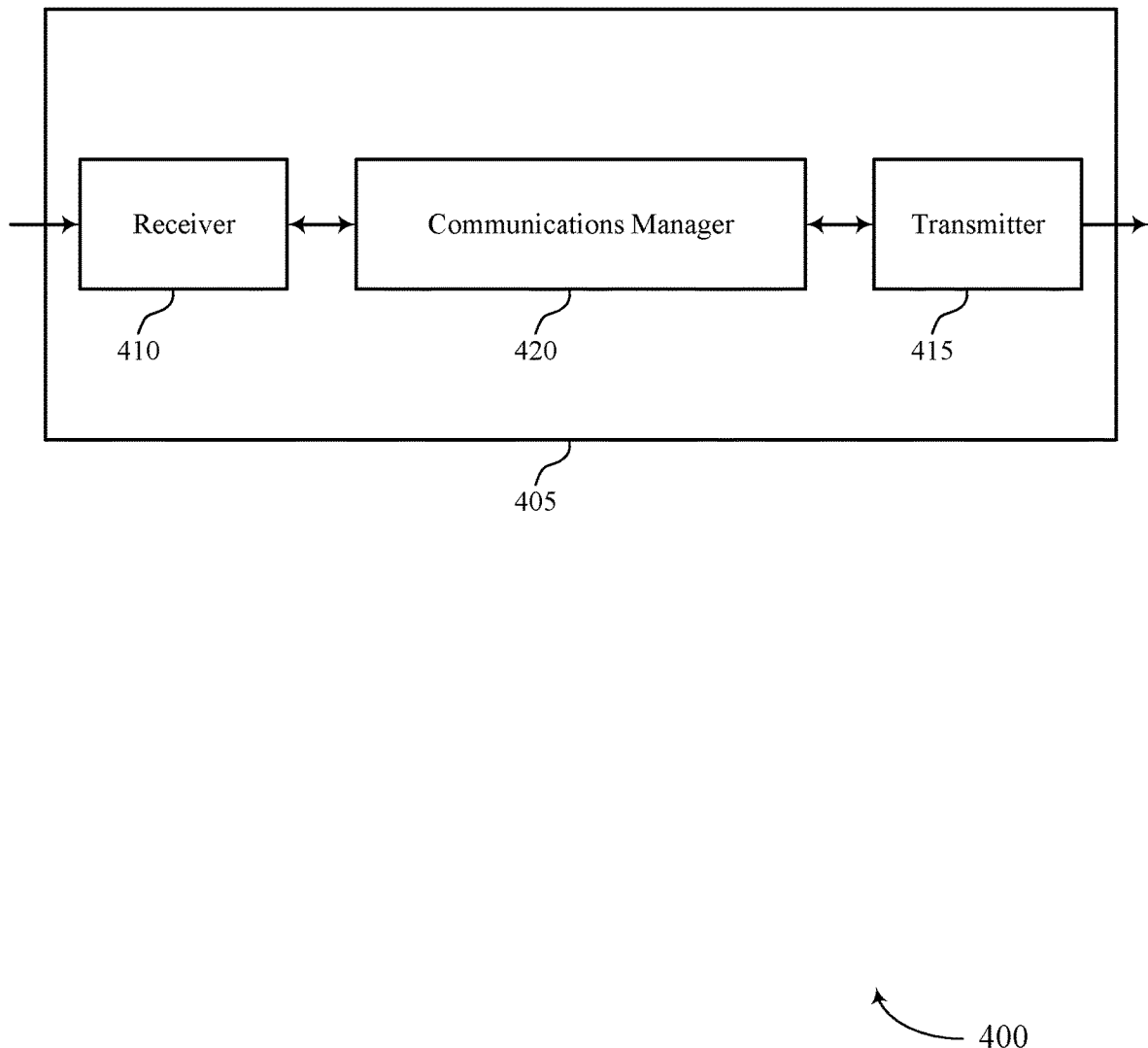
FIGS. 4 and 5 show block diagrams of devices that support wideband micro sleep techniques in accordance with aspects of the present disclosure.

FIG. 4 shows a block diagram 400 of a device 405 that supports wideband micro sleep techniques in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to wideband micro sleep techniques). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to wideband micro sleep techniques). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of wideband micro sleep techniques as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first UE in accordance with examples as disclosed herein. For example, the communications manager 420 may be configured as or otherwise support a means for receiving, via a set of one or more antennas, a message from a second UE, where a first symbol period and a second symbol period of the message include a duplicated signal, the first symbol period being immediately prior to the second symbol period in a time domain. The communications manager 420 may be configured as or otherwise support a means for calculating, for each antenna of the set of one or more antennas, a correlation between first data included in the first symbol period and second data included in the second symbol period of the message. The communications manager 420 may be configured as or otherwise support a means for powering down at least one RF chain based on calculating the correlation between the first data included in the first symbol period and the second data included in the second symbol period, where the at least one RF chain is powered down based on a result of the calculated correlation satisfying a threshold value.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for wideband micro sleep which may reduce the amount of modem processing and subsequent power consumption and overheating at the UE. As such, supported techniques may include improved network operations, and, in some examples, may promote network efficiencies, among other benefits.

Figure 5:
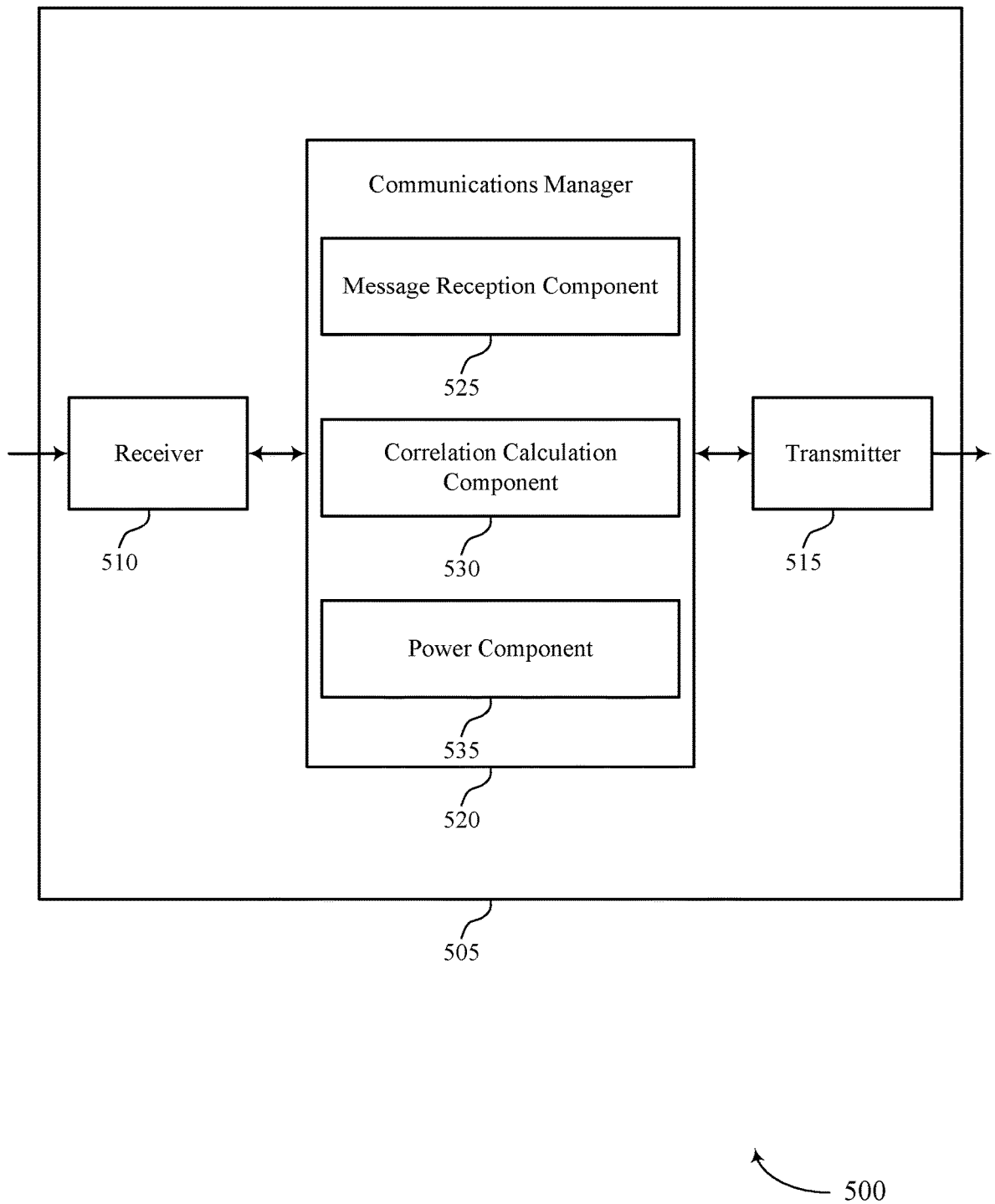

FIG. 5 shows a block diagram 500 of a device 505 that supports wideband micro sleep techniques in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to wideband micro sleep techniques). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to wideband micro sleep techniques). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of wideband micro sleep techniques as described herein. For example, the communications manager 520 may include a message reception component 525, a correlation calculation component 530, a power component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. The message reception component 525 may be configured as or otherwise support a means for receiving, via a set of one or more antennas, a message from a second UE, where a first symbol period and a second symbol period of the message include a duplicated signal, the first symbol period being immediately prior to the second symbol period in a time domain. The correlation calculation component 530 may be configured as or otherwise support a means for calculating, for each antenna of the set of one or more antennas, a correlation between first data included in the first symbol period and second data included in the second symbol period of the message. The power component 535 may be configured as or otherwise support a means for powering down at least one RF chain based on calculating the correlation between the first data included in the first symbol period and the second data included in the second symbol period, where the at least one RF chain is powered down based on a result of the calculated correlation satisfying a threshold value.

Figure 6:
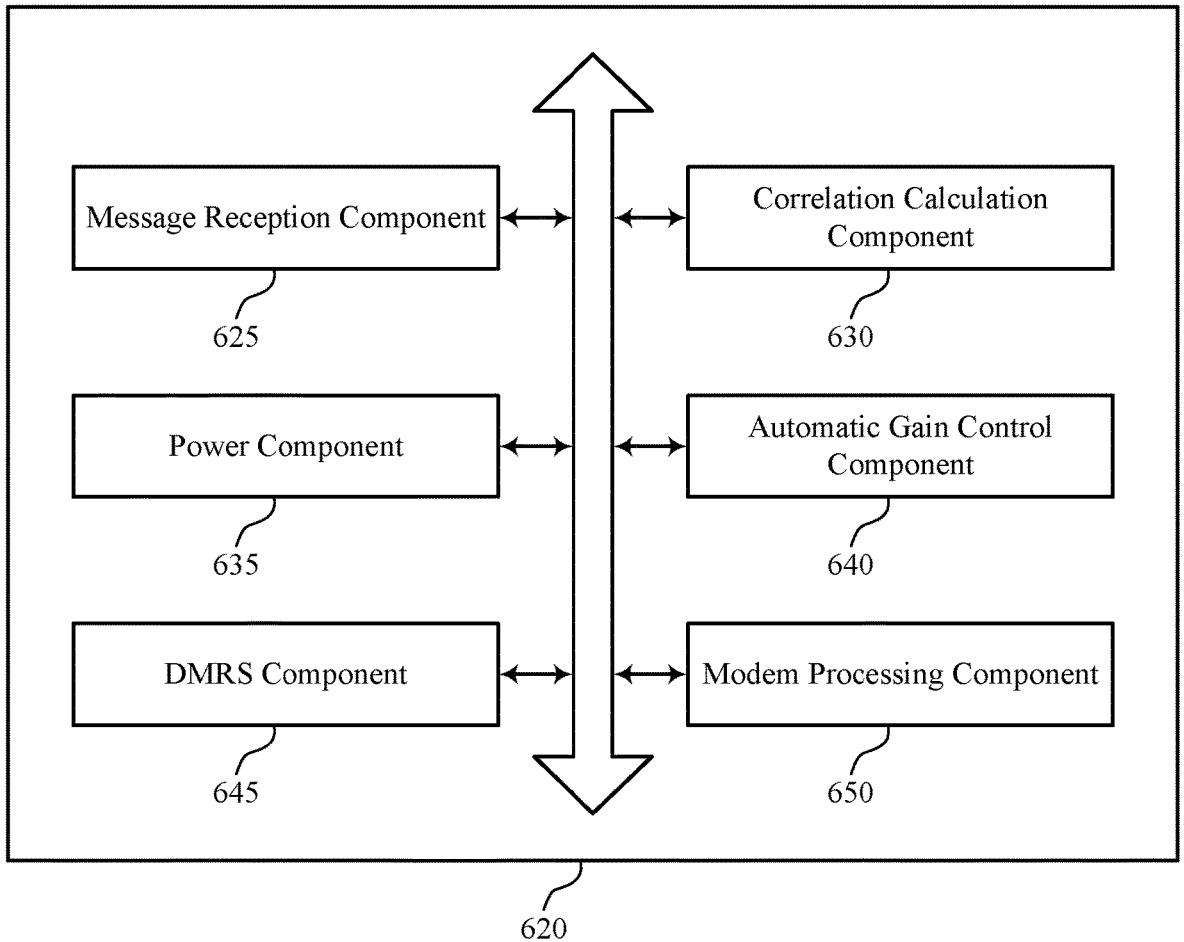
FIG. 6 shows a block diagram of a communications manager that supports wideband micro sleep techniques in accordance with aspects of the present disclosure.

FIG. 6 shows a block diagram 600 of a communications manager 620 that supports wideband micro sleep techniques in accordance with aspects of the present disclosure. The communications manager 620 may be an example of aspects of a communications manager 420, a communications manager 520, or both, as described herein. The communications manager 620, or various components thereof, may be an example of means for performing various aspects of wideband micro sleep techniques as described herein. For example, the communications manager 620 may include a message reception component 625, a correlation calculation component 630, a power component 635, an AGC component 640, a DMRS component 645, a modem processing component 650, or any combination thereof. Each of these components may communicate, directly or indirectly, with one another (e.g., via one or more buses).

The communications manager 620 may support wireless communication at a first UE in accordance with examples as disclosed herein. The message reception component 625 may be configured as or otherwise support a means for receiving, via a set of one or more antennas, a message from a second UE, where a first symbol period and a second symbol period of the message include a duplicated signal, the first symbol period being immediately prior to the second symbol period in a time domain. The correlation calculation component 630 may be configured as or otherwise support a means for calculating, for each antenna of the set of one or more antennas, a correlation between first data included in the first symbol period and second data included in the second symbol period of the message. The power component 635 may be configured as or otherwise support a means for powering down at least one RF chain based on calculating the correlation between the first data included in the first symbol period and the second data included in the second symbol period, where the at least one RF chain is powered down based on a result of the calculated correlation satisfying a threshold value.

In some examples, to support receiving the message from the second UE, the message reception component 625 may be configured as or otherwise support a means for receiving the message on a channel that satisfies a threshold bandwidth, where the correlation between the first data included in the first symbol period and the second data included in the second symbol period is calculated for the channel that satisfies the threshold bandwidth.

In some examples, to support calculating the correlation between the first data included in the first symbol period and the second data included in the second symbol period of the message, the correlation calculation component 630 may be configured as or otherwise support a means for calculating the correlation between the first data included in the first symbol period and the second data included in the second symbol period based on an RSSI for at least one antenna of the set of one or more antennas.

In some examples, to support powering down the at least one RF chain based on calculating the correlation, the power component 635 may be configured as or otherwise support a means for powering down the at least one RF chain for one or more additional symbol periods of the message, the one or more additional symbol periods being after the second symbol period in the time domain.

In some examples, the modem processing component 650 may be configured as or otherwise support a means for powering down modem processing based on the result of the calculated correlation satisfying the threshold value, where the modem processing includes parameter estimation, channel and noise estimation, decoding, or any combination thereof.

In some examples, the power component 635 may be configured as or otherwise support a means for determining that the first symbol period and the second symbol period exclude control information based on the result of the calculated correlation satisfying the threshold value, where the at least one RF chain is powered down based on the determination.

In some examples, the AGC component 640 may be configured as or otherwise support a means for performing AGC based at least in part on receiving the message, where a same gain state is associated with the message and a second message received prior to the message. In some examples, the AGC component 640 may be configured as or otherwise support a means for applying the same gain state to the first symbol period and the second symbol period of the message.

In some examples, the AGC component 640 may be configured as or otherwise support a means for determining that a gain state has changed based on receiving the message and a second message received prior to the message. In some examples, the AGC component 640 may be configured as or otherwise support a means for performing AGC on the received message in response to the determination that the gain state has changed, where the AGC may be based on an initial portion of the first symbol period (e.g., until convergence). In such cases, the correlation between the first data included in the first symbol period and the second data included in the second symbol period may be based on the first data included in a remaining portion of the first symbol period (e.g., after the convergence) and a corresponding portion of the second symbol period, where the remaining portion of the first symbol period may be different from the initial portion of the first symbol period.

In some examples, to support calculating the correlation between the first data included in the first symbol period and the second data included in the second symbol period of the message, the DMRS component 645 may be configured as or otherwise support a means for calculating the correlation excluding one or more DMRS symbol patterns.

In some examples, the DMRS component 645 may be configured as or otherwise support a means for determining a DMRS pattern in a frequency domain across two or more symbols of the message, where the at least one RF chain is powered down based on the determined DMRS pattern and the result of the calculated correlation satisfying the threshold value.

In some examples, the at least one RF chain is powered down based on the result of the calculated correlation being less than the threshold value. In some examples, the first symbol period and the second symbol period are received at a beginning of the message.

Figure 7:
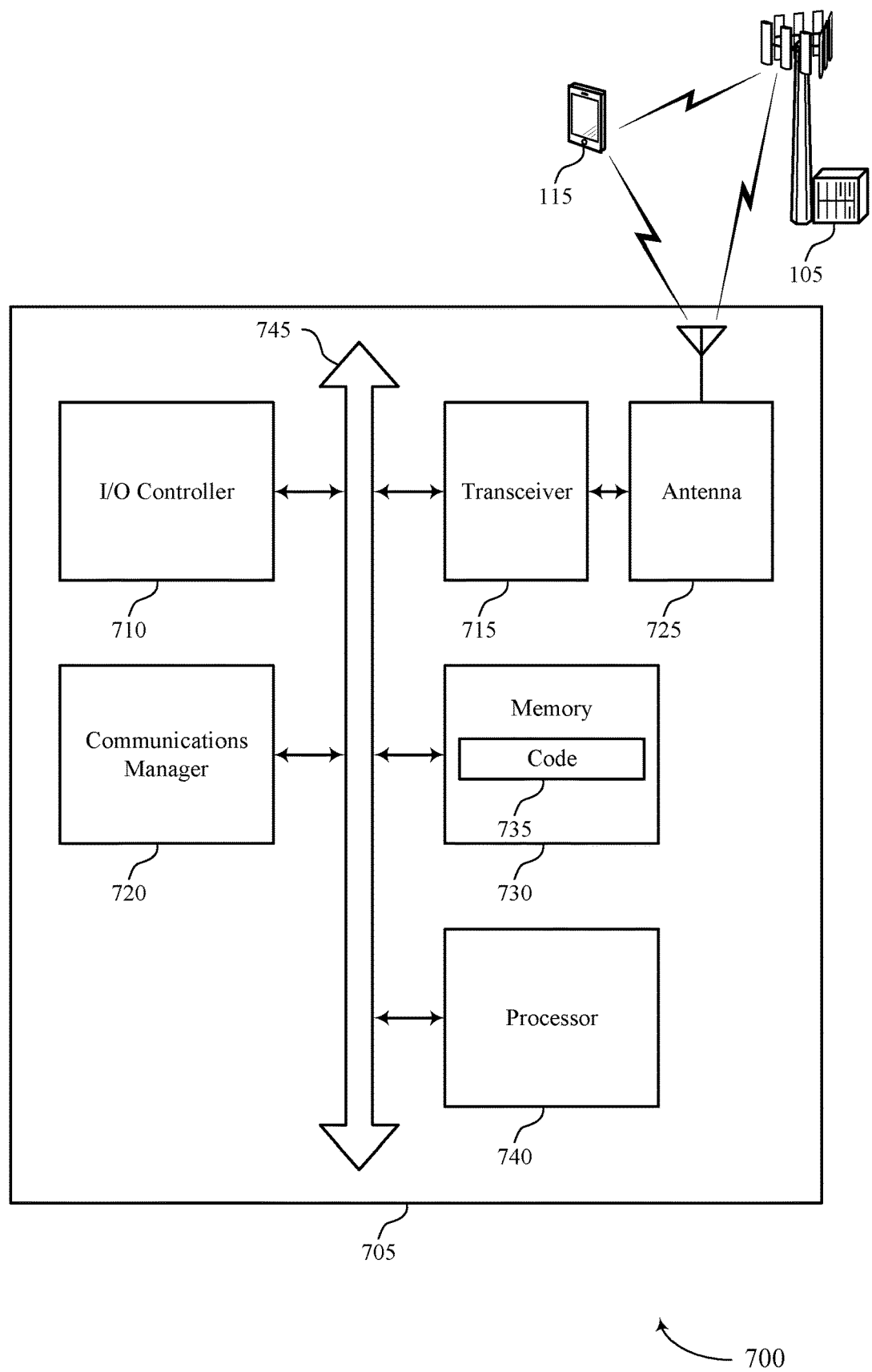
FIG. 7 shows a diagram of a system including a device that supports wideband micro sleep techniques in accordance with aspects of the present disclosure.

FIG. 7 shows a diagram of a system 700 including a device 705 that supports wideband micro sleep techniques in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting wideband micro sleep techniques). For example, the device 705 or a component of the device 705 may include a processor 740 and memory 730 coupled to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for receiving, via a set of one or more antennas, a message from a second UE, where a first symbol period and a second symbol period of the message include a duplicated signal, the first symbol period being immediately prior to the second symbol period in a time domain. The communications manager 720 may be configured as or otherwise support a means for calculating, for each antenna of the set of one or more antennas, a correlation between first data included in the first symbol period and second data included in the second symbol period of the message. The communications manager 720 may be configured as or otherwise support a means for powering down at least one RF chain based on calculating the correlation between the first data included in the first symbol period and the second data included in the second symbol period, where the at least one RF chain is powered down based on a result of the calculated correlation satisfying a threshold value.

By including or configuring the communications manager 720 in accordance with examples as described herein, the device 705 may support techniques for may support techniques for wideband micro sleep which may reduce the amount of modem processing and subsequent power consumption and overheating at the UE. As such, supported techniques may include improved network operations, and, in some examples, may promote network efficiencies, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of wideband micro sleep techniques as described herein, or the processor 740 and the memory 730 may be otherwise configured to perform or support such operations.

Figure 8:
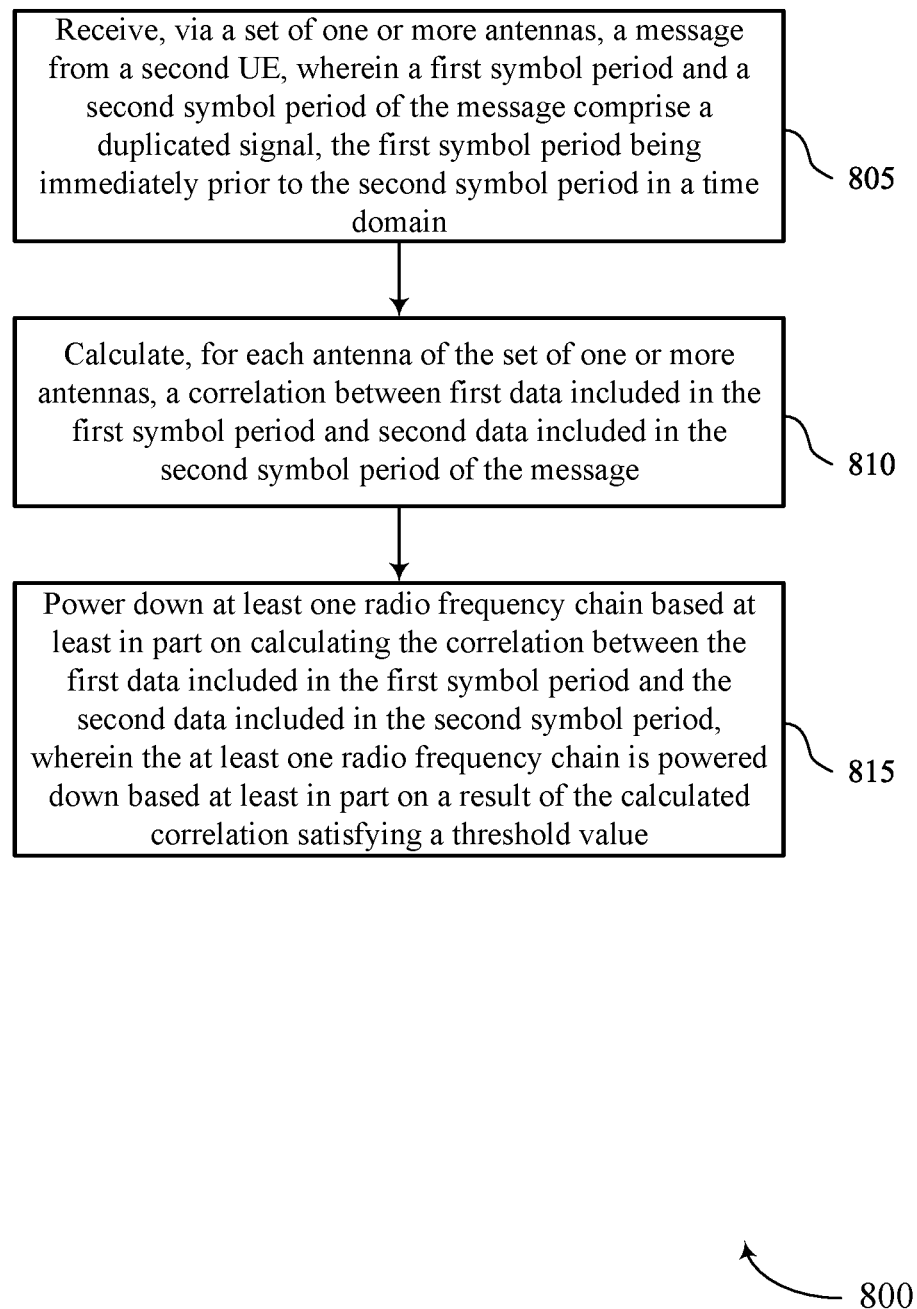
FIGS. 8 through 10 show flowcharts illustrating methods that support wideband micro sleep techniques in accordance with aspects of the present disclosure.

FIG. 8 shows a flowchart illustrating a method 800 that supports wideband micro sleep techniques in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving, via a set of one or more antennas, a message from a second UE, where a first symbol period and a second symbol period of the message include a duplicated signal, the first symbol period being immediately prior to the second symbol period in a time domain. The operations of 805 may be performed in accordance with examples as disclosed herein. In some examples, aspects of the operations of 805 may be performed by a message reception component 625 as described with reference to FIG. 6.

At 810, the method may include calculating, for each antenna of the set of one or more antennas, a correlation between first data included in the first symbol period and second data included in the second symbol period of the message. The operations of 810 may be performed in accordance with examples as disclosed herein. In some examples, aspects of the operations of 810 may be performed by a correlation calculation component 630 as described with reference to FIG. 6.

At 815, the method may include powering down at least one RF chain based on calculating the correlation between the first data included in the first symbol period and the second data included in the second symbol period, where the at least one RF chain is powered down based on a result of the calculated correlation satisfying a threshold value. The operations of 815 may be performed in accordance with examples as disclosed herein. In some examples, aspects of the operations of 815 may be performed by a power component 635 as described with reference to FIG. 6.

Figure 9:
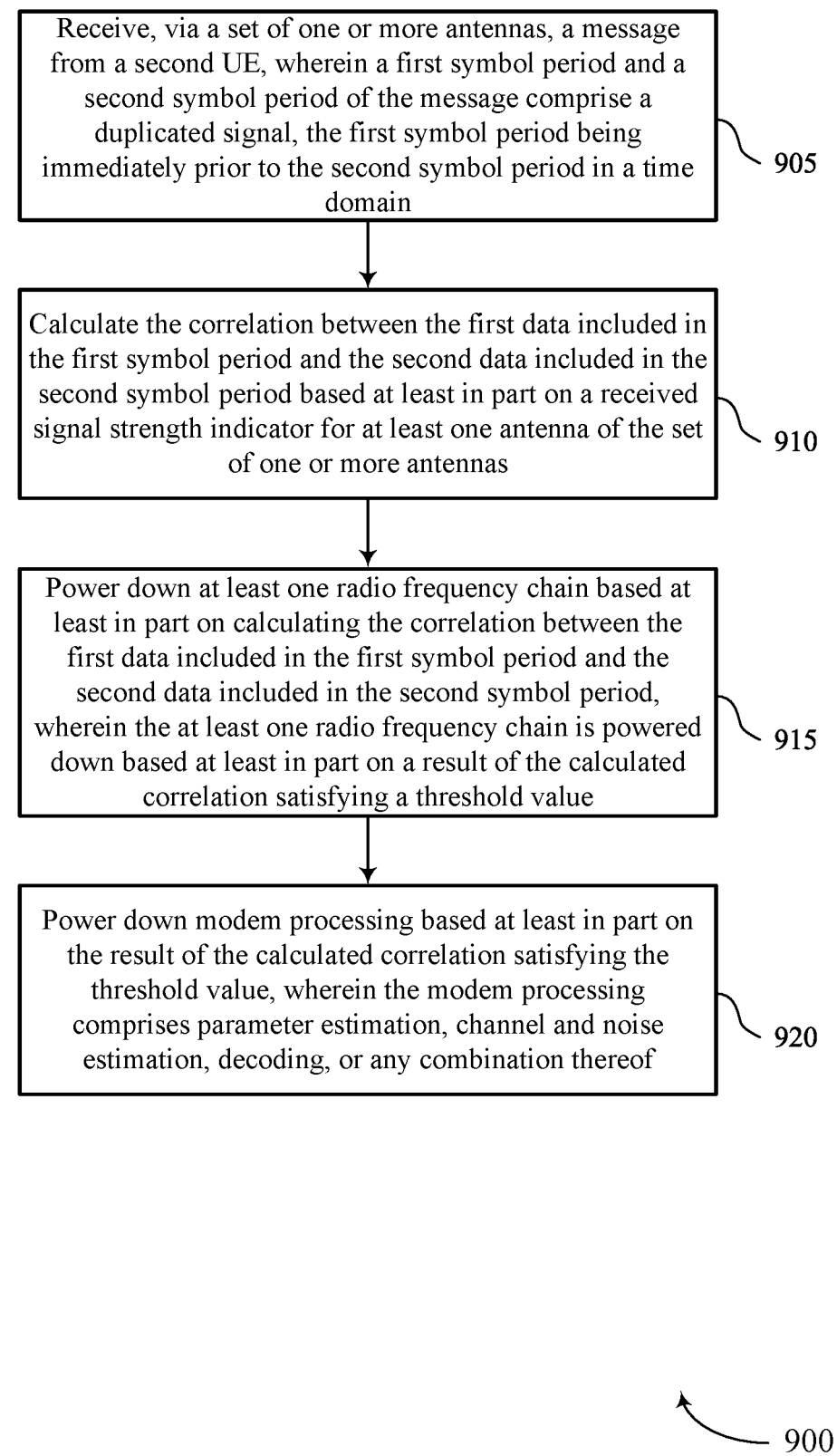

FIG. 9 shows a flowchart illustrating a method 900 that supports wideband micro sleep techniques in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving, via a set of one or more antennas, a message from a second UE, where a first symbol period and a second symbol period of the message include a duplicated signal, the first symbol period being immediately prior to the second symbol period in a time domain. The operations of 905 may be performed in accordance with examples as disclosed herein. In some examples, aspects of the operations of 905 may be performed by a message reception component 625 as described with reference to FIG. 6.

At 910, the method may include calculating the correlation between the first data included in the first symbol period and the second data included in the second symbol period based on an RSSI for at least one antenna of the set of one or more antennas. The operations of 910 may be performed in accordance with examples as disclosed herein. In some examples, aspects of the operations of 910 may be performed by a correlation calculation component 630 as described with reference to FIG. 6.

At 915, the method may include powering down at least one RF chain based on calculating the correlation between the first data included in the first symbol period and the second data included in the second symbol period, where the at least one RF chain is powered down based on a result of the calculated correlation satisfying a threshold value. The operations of 915 may be performed in accordance with examples as disclosed herein. In some examples, aspects of the operations of 915 may be performed by a power component 635 as described with reference to FIG. 6.

At 920, the method may include powering down modem processing based on the result of the calculated correlation satisfying the threshold value, where the modem processing includes parameter estimation, channel and noise estimation, decoding, or any combination thereof. The operations of 920 may be performed in accordance with examples as disclosed herein. In some examples, aspects of the operations of 920 may be performed by a modem processing component 650 as described with reference to FIG. 6.

Figure 10:
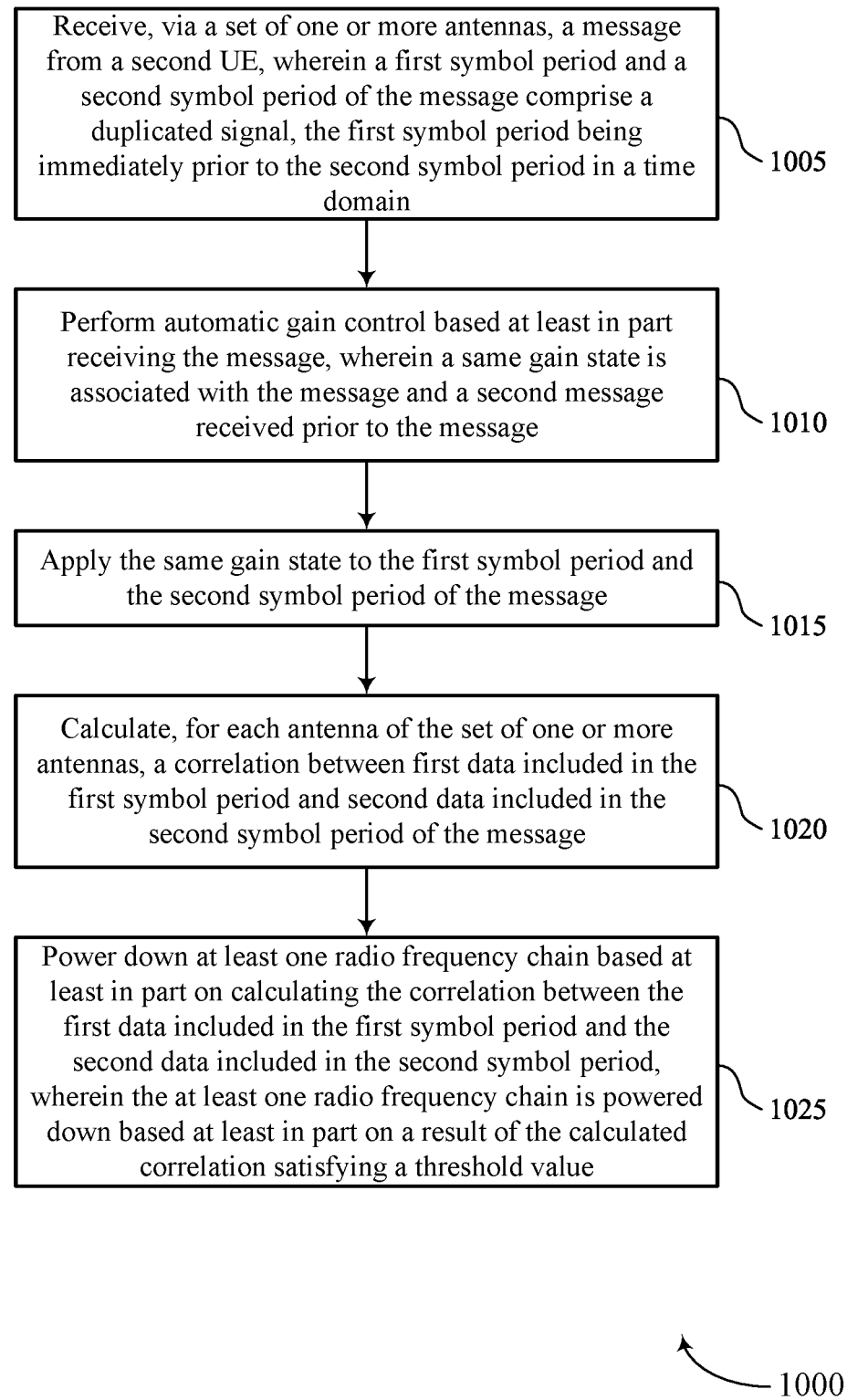

FIG. 10 shows a flowchart illustrating a method 1000 that supports wideband micro sleep techniques in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving, via a set of one or more antennas, a message from a second UE, where a first symbol period and a second symbol period of the message include a duplicated signal, the first symbol period being immediately prior to the second symbol period in a time domain. The operations of 1005 may be performed in accordance with examples as disclosed herein. In some examples, aspects of the operations of 1005 may be performed by a message reception component 625 as described with reference to FIG. 6.

At 1010, the method may include performing AGC based at least in part on receiving the message, where a same gain state is associated with the message and a second message received prior to the message. The operations of 1010 may be performed in accordance with examples as disclosed herein. In some examples, aspects of the operations of 1010 may be performed by an AGC component 640 as described with reference to FIG. 6.

At 1015, the method may include applying the same gain state to the first symbol period and the second symbol period of the message. The operations of 1015 may be performed in accordance with examples as disclosed herein. In some examples, aspects of the operations of 1015 may be performed by an AGC component 640 as described with reference to FIG. 6.

At 1020, the method may include calculating, for each antenna of the set of one or more antennas, a correlation between first data included in the first symbol period and second data included in the second symbol period of the message. The operations of 1020 may be performed in accordance with examples as disclosed herein. In some examples, aspects of the operations of 1020 may be performed by a correlation calculation component 630 as described with reference to FIG. 6.

At 1025, the method may include powering down at least one RF chain based on calculating the correlation between the first data included in the first symbol period and the second data included in the second symbol period, where the at least one RF chain is powered down based on a result of the calculated correlation satisfying a threshold value. The operations of 1025 may be performed in accordance with examples as disclosed herein. In some examples, aspects of the operations of 1025 may be performed by a power component 635 as described with reference to FIG. 6.

The following provides an overview of aspects of the present disclosure:

Aspect 1: A method for wireless communication at a first UE, comprising: receiving, via a set of one or more antennas, a message from a second UE, wherein a first symbol period and a second symbol period of the message comprise a duplicated signal, the first symbol period being immediately prior to the second symbol period in a time domain; calculating, for each antenna of the set of one or more antennas, a correlation between first data included in the first symbol period and second data included in the second symbol period of the message; and powering down at least one RF chain based at least in part on calculating the correlation between the first data included in the first symbol period and the second data included in the second symbol period, wherein the at least one RF chain is powered down based at least in part on a result of the calculated correlation satisfying a threshold value.

Aspect 2: The method of aspect 1, wherein receiving the message from the second UE comprises: receiving the message on a channel that satisfies a threshold bandwidth, wherein the correlation between the first data included in first symbol period and the second data included in the second symbol period is calculated for the channel that satisfies the threshold bandwidth.

Aspect 3: The method of any of aspects 1 through 2, wherein calculating the correlation between the first data included in the first symbol period and the second data included in the second symbol period of the message comprises: calculating the correlation between the first data included in the first symbol period and the second data included in the second symbol period based at least in part on an RSSI for at least one antenna of the set of one or more antennas.

Aspect 4: The method of any of aspects 1 through 3, wherein powering down the at least one RF chain based at least in part on calculating the correlation comprises: powering down the at least one RF chain for one or more additional symbol periods of the message, the one or more additional symbol periods being after the second symbol period in the time domain.

Aspect 5: The method of aspect 4, further comprising: powering down modem processing based at least in part on the result of the calculated correlation satisfying the threshold value, wherein the modem processing comprises parameter estimation, channel and noise estimation, decoding, or any combination thereof.

Aspect 6: The method of any of aspects 1 through 5, further comprising: determining that the first symbol period and the second symbol period exclude control information based at least in part on the result of the calculated correlation satisfying the threshold value, wherein the at least one RF chain is powered down based at least in part on the determination.

Aspect 7: The method of any of aspects 1 through 6, further comprising: performing AGC based at least in part on receiving the message, wherein a same gain state is associated with the message and a second message received prior to the message; and applying the same gain state to the first symbol period and the second symbol period of the message.

Aspect 8: The method of any of aspects 1 through 7, further comprising: determining that a gain state has changed based at least in part on receiving the message and a second message received prior to the message; and performing AGC on the received message in response to the determination that the gain state has changed, wherein the AGC is based at least in part on an initial portion of the first symbol period, and wherein the correlation between the first data included in the first symbol period and the second data included in the second symbol period is based at least in part on the first data included in a remaining portion of the first symbol period and a corresponding portion of the second symbol period, the remaining portion of the first symbol period being different from the initial portion.

Aspect 9: The method of any of aspects 1 through 8, wherein calculating the correlation between the first data included in the first symbol period and the second data included in the second symbol period of the message comprises: calculating the correlation excluding one or more DMRS symbol patterns.

Aspect 10: The method of any of aspects 1 through 8, further comprising: determining a DMRS pattern in a frequency domain across two or more symbols of the message, wherein the at least one RF chain is powered down based at least in part on the determined DMRS pattern and the result of the calculated correlation satisfying the threshold value.

Aspect 11: The method of any of aspects 1 through 10, wherein the at least one RF chain is powered down based at least in part on the result of the calculated correlation being less than the threshold value.

Aspect 12: The method of any of aspects 1 through 11, wherein the first symbol period and the second symbol period are received at a beginning of the message.

Aspect 13: An apparatus for wireless communication at a first UE, comprising a processor; memory coupled with the processor; and instructions stored in the memory and executable by the processor to cause the apparatus to perform a method of any of aspects 1 through 12.

Aspect 14: An apparatus for wireless communication at a first UE, comprising at least one means for performing a method of any of aspects 1 through 12.

Aspect 15: A non-transitory computer-readable medium storing code for wireless communication at a first UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    receiving, via a set of one or more antennas, a message from a second UE, wherein a first symbol period and a second symbol period of the message comprise a duplicated signal, the first symbol period being immediately prior to the second symbol period in a time domain;
    calculating, for each antenna of the set of one or more antennas, a correlation between first data included in the first symbol period and second data included in the second symbol period of the message, wherein the correlation indicates whether the message is for the first UE; and
    powering down at least one radio frequency chain based at least in part on a result of the calculated correlation satisfying a threshold value.

2. The method of claim 1, wherein receiving the message from the second UE comprises:
    receiving the message on a channel that satisfies a threshold bandwidth, wherein the correlation between the first data included in the first symbol period and the second data included in the second symbol period is calculated for the channel that satisfies the threshold bandwidth.

3. The method of claim 1, wherein calculating the correlation between the first data included in the first symbol period and the second data included in the second symbol period of the message comprises:
    calculating the correlation between the first data included in the first symbol period and the second data included in the second symbol period based at least in part on a received signal strength indicator for at least one antenna of the set of one or more antennas.

4. The method of claim 1, wherein powering down the at least one radio frequency chain based at least in part on calculating the correlation comprises:
    powering down the at least one radio frequency chain for one or more additional symbol periods of the message, the one or more additional symbol periods being after the second symbol period in the time domain.

5. The method of claim 4, further comprising:
    powering down modem processing based at least in part on the result of the calculated correlation satisfying the threshold value, wherein the modem processing comprises parameter estimation, channel and noise estimation, decoding, or any combination thereof.

6. The method of claim 1, further comprising:
    determining that the first symbol period and the second symbol period exclude control information based at least in part on the result of the calculated correlation satisfying the threshold value, wherein the at least one radio frequency chain is powered down based at least in part on the determination.

7. The method of claim 1, further comprising:
    performing automatic gain control based at least in part on receiving the message, wherein a same gain state is associated with the message and a second message received prior to the message; and
    applying the same gain state to the first symbol period and the second symbol period of the message.

8. The method of claim 1, further comprising:
    determining that a gain state has changed based at least in part on receiving the message and a second message received prior to the message; and
    performing automatic gain control on the received message in response to the determination that the gain state has changed, wherein the automatic gain control is based at least in part on an initial portion of the first symbol period, and wherein the correlation between the first data included in the first symbol period and the second data included in the second symbol period is based at least in part on the first data included in a remaining portion of the first symbol period and a corresponding portion of the second symbol period, the remaining portion of the first symbol period being different from the initial portion.

9. The method of claim 1, wherein calculating the correlation between the first data included in the first symbol period and the second data included in the second symbol period of the message comprises:
    calculating the correlation excluding one or more demodulation reference signal symbol patterns.
10. The method of claim 1, further comprising:
    determining a demodulation reference signal pattern in a frequency domain across two or more symbols of the message, wherein the at least one radio frequency chain is powered down based at least in part on the determined demodulation reference signal pattern and the result of the calculated correlation satisfying the threshold value.
11. The method of claim 1, wherein the at least one radio frequency chain is powered down based at least in part on the result of the calculated correlation being less than the threshold value.
12. The method of claim 1, wherein the first symbol period and the second symbol period are received at a beginning of the message.
13. An apparatus for wireless communication at a first user equipment (UE), comprising:
    a processor;
    memory coupled with the processor; and
    instructions stored in the memory and executable by the processor to cause the apparatus to:
        receive, via a set of one or more antennas, a message from a second UE, wherein a first symbol period and a second symbol period of the message comprise a duplicated signal, the first symbol period being immediately prior to the second symbol period in a time domain;
        calculate, for each antenna of the set of one or more antennas, a correlation between first data included in the first symbol period and second data included in the second symbol period of the message, wherein the correlation indicated whether the message is for the first UE; and
        power down at least one radio frequency chain based at least in part on a result of the calculated correlation satisfying a threshold value.
14. The apparatus of claim 13, wherein the instructions to receive the message from the second UE are executable by the processor to cause the apparatus to:
    receive the message on a channel that satisfies a threshold bandwidth, wherein the correlation between the first data included in the first symbol period and the second data included in the second symbol period is calculated for the channel that satisfies the threshold bandwidth.
15. The apparatus of claim 13, wherein the instructions to calculate the correlation between the first data included in the first symbol period and the second data included in the second symbol period of the message are executable by the processor to cause the apparatus to:
    calculate the correlation between the first data included in the first symbol period and the second data included in the second symbol period based at least in part on a received signal strength indicator for at least one antenna of the set of one or more antennas.
16. The apparatus of claim 13, wherein the instructions to power down the at least one radio frequency chain based at least in part on calculating the correlation are executable by the processor to cause the apparatus to:
    power down the at least one radio frequency chain for one or more additional symbol periods of the message, the one or more additional symbol periods being after the second symbol period in the time domain.
17. The apparatus of claim 16, wherein the instructions are further executable by the processor to cause the apparatus to:
    power down modem processing based at least in part on the result of the calculated correlation satisfying the threshold value, wherein the modem processing comprises parameter estimation, channel and noise estimation, decoding, or any combination thereof.
18. The apparatus of claim 13, wherein the instructions are further executable by the processor to cause the apparatus to:
    determine that the first symbol period and the second symbol period exclude control information based at least in part on the result of the calculated correlation satisfying the threshold value, wherein the at least one radio frequency chain is powered down based at least in part on the determination.
19. The apparatus of claim 13, wherein the instructions are further executable by the processor to cause the apparatus to:
    perform automatic gain control based at least in part on receiving the message, wherein a same gain state is associated with the message and a second message received prior to the message; and
    apply the same gain state to the first symbol period and the second symbol period of the message.
20. The apparatus of claim 13, wherein the instructions are further executable by the processor to cause the apparatus to:
    determine that a gain state has changed based at least in part on receiving the message and a second message received prior to the message; and
    perform automatic gain control on the received message in response to the determination that the gain state has changed, wherein the automatic gain control is based at least in part on an initial portion of the first symbol period, and wherein the correlation between the first data included in the first symbol period and the second data included in the second symbol period is based at least in part on the first data included in a remaining portion of the first symbol period and a corresponding portion of the second symbol period, the remaining portion of the first symbol period being different from the initial portion.
21. The apparatus of claim 13, wherein the instructions to calculate the correlation between the first data included in the first symbol period and the second data included in the second symbol period of the message are executable by the processor to cause the apparatus to:
    calculate the correlation excluding one or more demodulation reference signal symbol patterns.
22. The apparatus of claim 13, wherein the instructions are further executable by the processor to cause the apparatus to:
    determine a demodulation reference signal pattern in a frequency domain across two or more symbols of the message, wherein the at least one radio frequency chain is powered down based at least in part on the determined demodulation reference signal pattern and the result of the calculated correlation satisfying the threshold value.
23. The apparatus of claim 13, wherein the at least one radio frequency chain is powered down based at least in part on the result of the calculated correlation being less than the threshold value.

24. The apparatus of claim 13, wherein the first symbol period and the second symbol period are received at a beginning of the message.

25. An apparatus for wireless communication at a first user equipment (UE), comprising:
    means for receiving, via a set of one or more antennas, a message from a second UE, wherein a first symbol period and a second symbol period of the message comprise a duplicated signal, the first symbol period being immediately prior to the second symbol period in a time domain;
    means for calculating, for each antenna of the set of one or more antennas, a correlation between first data included in the first symbol period and second data included in the second symbol period of the message, wherein the correlation indicates whether the message is for the first UE; and
    means for powering down at least one radio frequency chain based at least in part on a result of the calculated correlation satisfying a threshold value.

26. The apparatus of claim 25, wherein the means for receiving the message from the second UE comprise:
    means for receiving the message on a channel that satisfies a threshold bandwidth, wherein the correlation between the first data included in the first symbol period and the second data included in the second symbol period is calculated for the channel that satisfies the threshold bandwidth.

27. The apparatus of claim 25, wherein the means for calculating the correlation between the first data included in the first symbol period and the second data included in the second symbol period of the message comprise:
    means for calculating the correlation between the first data included in the first symbol period and the second data included in the second symbol period based at least in part on a received signal strength indicator for at least one antenna of the set of one or more antennas.

28. The apparatus of claim 25, wherein the means for powering down the at least one radio frequency chain based at least in part on calculating the correlation comprise:
    means for powering down the at least one radio frequency chain for one or more additional symbol periods of the message, the one or more additional symbol periods being after the second symbol period in the time domain.

29. The apparatus of claim 28, further comprising:
    means for powering down modem processing based at least in part on the result of the calculated correlation satisfying the threshold value, wherein the modem processing comprises parameter estimation, channel and noise estimation, decoding, or any combination thereof.

30. A non-transitory computer-readable medium storing code for wireless communication at a first user equipment (UE), the code comprising instructions executable by a processor to:
    receive, via a set of one or more antennas, a message from a second UE, wherein a first symbol period and a second symbol period of the message comprise a duplicated signal, the first symbol period being immediately prior to the second symbol period in a time domain;
    calculate, for each antenna of the set of one or more antennas, a correlation between first data included in the first symbol period and second data included in the second symbol period of the message, wherein the correlation indicates whether the message is for the first UE; and
    power down at least one radio frequency chain based at least in part on a result of the calculated correlation satisfying a threshold value.

* * * * *